United States Statutory Invention Registration [19]

[11] Reg. Number: H767

Kretschmer, Jr. et al. [43] Published: Apr. 3, 1990

[54] RANGING METHOD AND SYSTEM, ESPECIALLY FOR RADAR SIGNAL PROCESSING FOR AMBIGUOUS RANGE RADARS

[75] Inventors: Frank F. Kretschmer, Jr., Laurel; Karl R. Gerlach, Dunkirk, both of Md.

[73] Assignee: United States of America, Washington, D.C.

[21] Appl. No.: 372,962

[22] Filed: Jun. 29, 1989

[51] Int. Cl.[4] ..... G01S 13/64; G01S 13/10

[52] U.S. Cl. ..... 342/145; 342/134; 342/201

*Primary Examiner*—Thomas H. Tarcza
*Assistant Examiner*—Linda J. Wallace
*Attorney, Agent, or Firm*—Thomas E. McDonnell; Edward F. Miles

[57] ABSTRACT

A method and apparatus exploiting the discovery that the cross-correlation of rows of Frank or P4 matrices of a given spacing sum to zero. In a ranging system, such as a radar, pulses are coded according to the rows of a Frank or P4 matrix, transmitted sequentially and each return processed sequentially through a filter matched to one of the coded pulses. (A different preselected filter is used for each return.) The sequence of filters is chosen so that for returns for a given range interval, each filter is matched to the returning pulse, resulting in outputs from the filters representing auto-correlations of the returned pulses. These outputs are time delayed added coherently to form the compressed pulse, and annunciated as a target hit. Should the filters and returns be mismatched, as with ambiguous stationary clutter returns, the outputs of the filters are cross-correlations which, according to said discovery, sum to zero. Thus the invention operates to remove ambiguous range clutter from returns in such a ranging system.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

$$\begin{bmatrix} F_0 \\ F_1 \\ F_2 \\ F_3 \end{bmatrix} \quad \begin{bmatrix} 1 & 1 & 1 & 1 \\ 1 & j & -1 & j \\ 1 & -1 & 1 & -1 \\ 1 & -j & -1 & j \end{bmatrix}$$

| | FILTERS MATCH TO | | | |
|---|---|---|---|---|
| | $t_0$ | $t_1$ | $t_2$ | $t_3$ |
| CHANNEL : 0 | $F_0$ | $F_1$ | $F_2$ | $F_3$ |
| 1 | $F_3$ | $F_0$ | $F_1$ | $F_2$ |
| 2 | $F_2$ | $F_3$ | $F_0$ | $F_1$ |
| 3 | $F_1$ | $F_2$ | $F_3$ | $F_0$ |

RANGING METHOD AND SYSTEM, ESPECIALLY FOR RADAR SIGNAL PROCESSING FOR AMBIGUOUS RANGE RADARS

BACKGROUND OF THE INVENTION

In simplest form, a radar system consists of the generation of a pulse having a certain duration, followed by a listening period in which returns are received. A radar designer usually wishes to increase the power of target returns to provide better detection. The most straightforward way to do this is to increase pulse amplitude. Unfortunately, useful radars require pulse amplitudes that would result in waveguide arcing and electrical breakdown. A conventional way to circumvent this problem is to use pulse compression techniques, i.e. transmitting a series of low amplitude pulses (subpulses) of the same aggregate energy as a higher amplitude pulse. The pulses are typically modulated (the modulated pulse also called a coded waveform) and transmitted. Returns are processed through a matched filter (i.e. a filter whose transfer function optimizes the signal to noise ratio), resulting in a signal that is a compressed pulse that is also the auto-correlation of the coded waveform in the absence of doppler shifts. Pulse coding can be expressed in matrix form, examples of which are matrices for the well-known Frank and P4 codes. The matrix describes the phase shifting necessary to phase modulate the subpulses of a coded pulse. This matrix is a square matrix of dimension $N \times N$, each element of which represents a phase shift (the phase modulation) of one subpulse. The Frank or P4 code consists of concatenated $N^2$ subpulses having the phases described by the elements of the consecutive rows of the matrix, reading from left to right. An example of a Frank matrix is shown in FIG. 1 for $N=4$. The elements of, e.g., the second row, 1, j, $-1$, $-j$, describe the fifth to eighth subpulses with respective phase modulation of 1 (i.e. 0°), j (i.e. 90°), $-1$ (i.e. 180°), and $-j$ (i.e. $-90°$).

Such a radar system commonly operates by generating a sequence of identically coded waveforms, separated in time by detection, or listening intervals, in which the radar can detect returns of the transmitted waveform. The range for which the radar can receive unambiguously is limited to the distance a pulse can travel to and from the radar during its detection interval. This distance is called the unambiguous range. Often, downrange from the unambiguous range is clutter (e.g. hills) which can reflect radar returns, and such clutter can cause pulses to return to the radar during detection intervals for later pulses (i.e. be "folded over" into a later detection interval). Clutter causing foldover into the next pulse's detection interval is said to be located in the first ambiguous range, foldover into the second succeeding detection interval is said to be from the second ambiguous range, etc. Unambiguous range clutter is undesirable because it increases the cancellation requirements of the radar and the dwell time required to process clutter returns, and because it causes the range to be ambiguous in mapping applications.

SUMMARY OF THE INVENTION

Accordingly, an object of the invention is to automatically reduce or eliminate ambiguous range clutter in radar systems.

Another object is to identify the existence of non-ambiguous range clutter so as to facilitate existing techniques to eliminate or map clutter.

The invention derives from a discovery by the inventors of properties of the Frank and P4 matrices, in particular that the sum of cross-correlations between rows of a Frank or P4 matrix, spaced by a constant number of rows, is zero. More generally, for such a matrix of dimension $N \times N$, if the cross-correlations between rows q and m of the matrix are given by $C_{qm}(i)$, for $i=\pm 0, \pm 1, \pm 2, \ldots, \pm(N-1)$:

$$\sum_{q=1}^{N-1} C_{qm}(i) = 0,\ i = \pm 1, \pm 2, \ldots, \pm N-1$$

where $m=(q+r) \bmod N$, $r=1, 2, \ldots, (N-1)$.

In particular, the invention is a method and apparatus for transmitting and processing a sequence of coded pulses $F_1, F_2, \ldots, F_{N-1}, F_0, F_1, \ldots, F_{N-1}$, each of the coded pulses $F_n$, $n=0, 1, 2 \ldots, N-1$, being coded in accordance with the $(n+1)$th row of a Frank or P4 matrix of dimension $N \times N$;

each of the coded pulses being spaced from adjacent ones of the coded pulses by time intervals $t_0, t_1, \ldots, t_{N-1}$, each $F_n$ being followed immediately by a corresponding $t_n$, the last N of said time intervals being denominated detection intervals;

selecting an integer c from the set whose members are: $0, 1, 2, \ldots, N-1$;

detecting returns of the coded pulses during each of the detection intervals;

passing the returns detected in each detection interval through a corresponding filter matched to one of the coded pulses $F_j$, $j=(N+n-c) \bmod N$, $j=0, 1, 2, \ldots, N-1$; and coherently summing the outputs of the filters generated during all N detection intervals.

The importance of this scheme derives form the inventors' discovery that the cross-correlations of rows of Frank or P4 matrices spaced equally apart sum to zero. In most simple form, such a system is designed to generate a series of pulses $F_0, F_1, F_2, \ldots, F_{N-1}$. After each pulse the system processes returns using a filter matched to the pulse, changing the filter with each detection interval. Thus over all the detection intervals the system employs a sequence of filters matched to the various pulses $F_n$, and employs them in the same order as the pulses to which they are matched. Each value of c shifts the filter sequence in a circular manner, and clutter time shifts the returns an amount determined by the particular ambiguous range in which the clutter is situated. If these shifts are identical, each returning pulse in each interval is matched to the filter employed, and the detected signal in each interval is the auto-correlation of the filter's transfer function. The coherent sum of these auto-correlations over the detection intervals yields the compressed pulse. If the shifts are not identical, the detected output in each interval is the cross-correlation of the pulse and the transfer function of the filter. Because the pulses are coded sequentially according to rows of a Frank or P4 matrix, and because the filters are not matched to these pulses in this sequence, the coherent sum of these over the detection intervals constitute the sum of cross-correlations between rows of the coding matrix spaced a constant amount apart. The inventors' discovery about Frank or P4 matrices demonstrates that this sum is zero.

Thus by choice of c a system according to the invention can "tune" itself to detect returns from the unambiguous range, or any of the ambiguous ranges, and reject all other returns. One could also have a plurality of these systems, each tuned to one range, and thus detect all returns and simultaneously determine from which range each return has come.

The invention is more fully understood from the following detailed description of a preferred embodiment, it being understood, however, that the invention is capable of extended application beyond the precise details of the preferred embodiment. Changes and modifications can be made that do not affect the spirit of the invention, nor exceed its scope, as expressed in the appended claims.

Accordingly, the invention is described with particular reference to the accompanying drawings, wherein:

DETAILED DESCRIPTION

Figures 1, 2, 5:
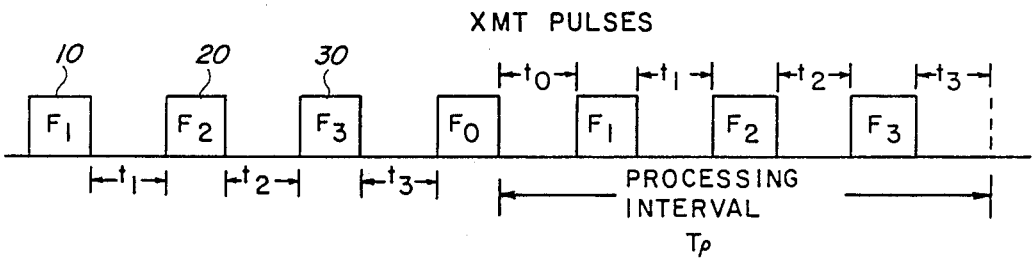
FIG. 1 is an example of a Frank matrix of dimension 4×4.
FIG. 2 is a schematic representation of the coded pulses used in a four channel embodiment of the invention.
FIG. 5 is a table listing the sequence of matched filters used in the invention.
Figure 3:
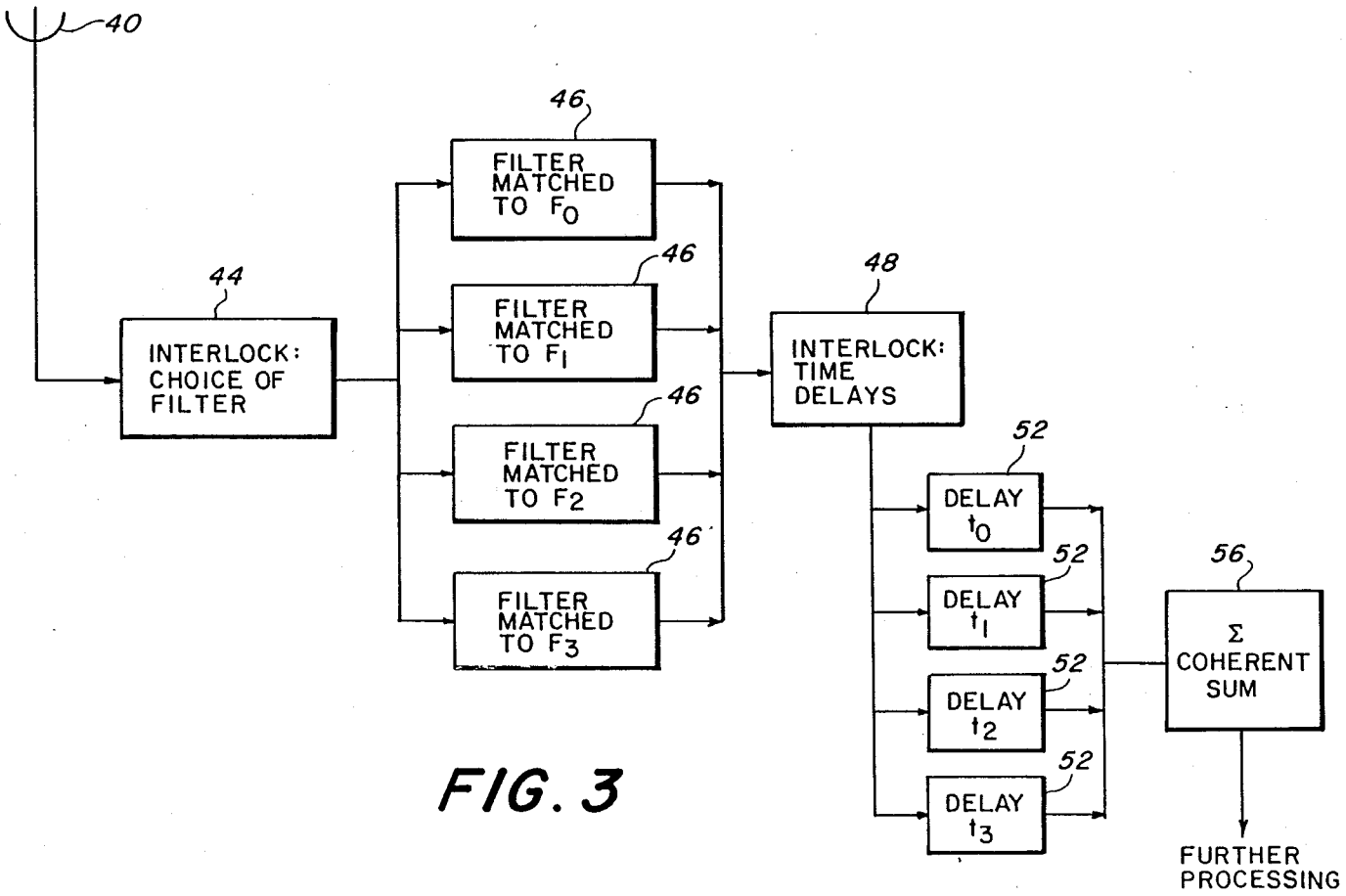
FIG. 3 is a schematic diagram of a processing system used with the invention.
Figure 4:
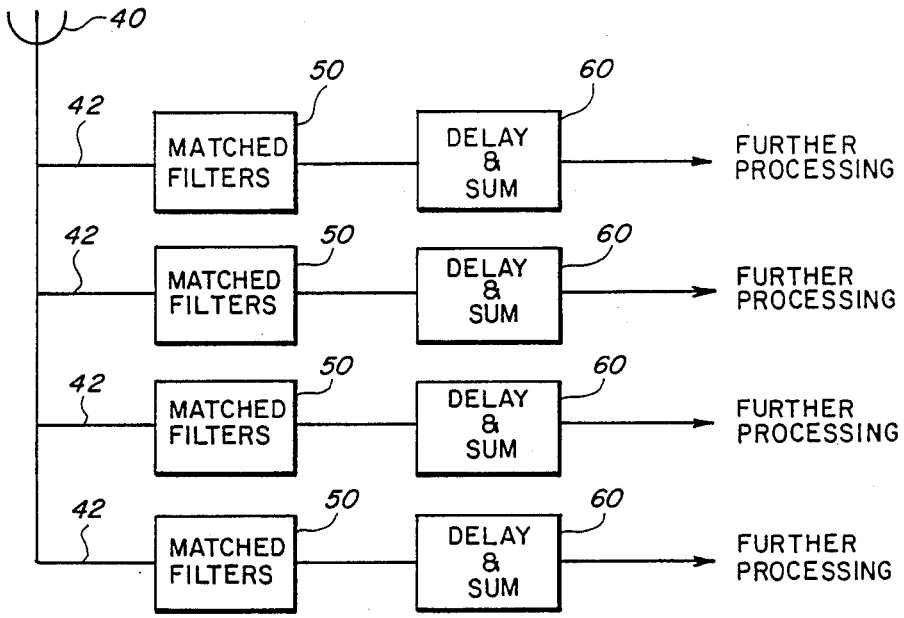
FIG. 4 is a schematic diagram of an alternative processing system according to the invention.

With reference to the drawing figures, like numbers indicating like parts throughout the several views, and with particular reference to FIG. 2, this figure shows schematically a radar waveforms using four coded pulses $F_0$, $F_1$, $F_2$, $F_3$. These coded pulses could be those corresponding respectively to the rows of a Frank or P4 matrix for N=4 (i.e., a 4×4 matrix). (The choice of N=4 is arbitrary, and is done here for clarity of explanation.) After each coded pulse $F_n$ is transmitted, the system "listens" for a period $t_n$ for returns of $F_n$. If target range is chosen properly, and no ambiguous range clutter is present, a return of $F_0$ should occur in $t_0$, a return of $F_1$ in $t_1$, etc. These returns are time delayed and coherently added by conventional circuitry. (Cf. FIGS. 3 and 4.)

The presence of ambiguous range clutter can cause "folding over" of returns of one coded pulse $F_n$ into the wrong detection interval $t_m$, $m \neq n$, resulting in spurious range returns. For example, a clutter return from the second ambiguous range would cause a coded pulse $F_0$ to arrive within $t_2$, $F_1$ to arrive in $t_3$, etc.

This is countered by first adding additional coded pulses $F_1$, $F_2$, $F_3$ (or, more generally, $F_1, F_2, \ldots, F_{N-1}$). These additional pulses are indicated respectively as members 10, 20, 30 in FIG. 2. Additional pulses 10, 20, 30 ensure that, if there is folding over, each detection interval $t_n$ will have a coded pulse folded into it. (I.e., even with folding over, over all four detection intervals (more generally N) a complete set of all four (more generally N) coded pulses will return. This is necessary for application of the inventors' discovery about Frank and P4 matrices.)

FIG. 3 shows schematically a system according to the invention. Antenna 40 receives a return which is passed by interlock 44 to a filter 46. Interlock 44 has conventional electronics (not shown) to steer the return to a preselected one of filters 46 during each detection interval. The filtered return passes to a second interlock 48 which contains conventional circuitry (not shown) to select an appropriate time delay 52 to permit coherent summing of the return by summer 56 over a complete set of detection intervals. In operation, interlock 44 sequences the choice of filters 46 to "tune" the system to a particular ambiguous (or the unambiguous) range as above described.

FIG. 4 shows an alternative arrangement having a plurality of legs 42, each constituted by a system as shown in FIG. 3. In particular, each leg 42 has a bank of matched filters 42 (corresponding to members 44 and 46 of FIG. 3), and delay and sum processors 60 (corresponding to members 48, 53, and 56 of FIG. 3). In this arrangement, the sequence of individual filters 46 in banks 50 is done to "tune" each leg 42 to a particular one of the first three ambiguous ranges, and the unambiguous range, respectively. In this way, all returns from these ranges can be detected simultaneously, and, depending on which leg detects the return, can identify the range of origin.

The invention has been described in what is considered to be the most practical and preferred embodiments. It is recognized, however, that obvious modifications may occur to those with skill in this art. Accordingly, the scope of the invention is to be discerned solely by reference to the appended claims.

We claim:

1. A method of ranging comprising steps for:

transmitting a sequence of coded pulses $F_1, F_2, \ldots F_0, F_1, \ldots, F_{N-1}$, each of said coded pulses $F_n$, n=0, 1, 2 . . . , N−1, being coded in accordance with the (n+1)th row of a Frank or P4 matrix of dimension N×N;

each of said coded pulses being spaced from adjacent ones of said coded pulses by time intervals $t_0, t_1, \ldots, t_{N-1}$, each $F_n$ being followed immediately by a corresponding $t_n$, the last N of said time intervals being denominated detection intervals;

selecting an integer c from the set whose members are: 0, 1, 2, . . . , N−1;

detecting returns of said coded pulses during each of said detection intervals;

processing said returns, said step for processing using a plurality of N filters, each filter of said plurality of N filters being matched to a corresponding one of said coded pulses, said step for processing comprising steps for:

passing each of said returns detected in each said detection interval $t_n$ through a corresponding one of said filters matched to one of said coded pulses $F_j$, j=(N+n−c) mod N; and coherently summing the outputs of said filters generated during said detection intervals.

2. An apparatus for ranging, said apparatus comprising:

means for transmitting a sequence of coded pulses $F_1, F_2, \ldots, F_0, F_1, \ldots, F_{N-1}$, each of said coded pulses $F_n$, n=0, 1, 2, . . . , N−1, being coded in accordance with the (n+1)th row of a Frank or P4 matrix of dimension N×N;

said means for transmitting being effective to cause each of said coded pulses to be spaced from adjacent ones of said coded pulses by time intervals $t_0, t_1, \ldots, t_{N-1}$, each $F_n$ being followed immediately by a corresponding $t_n$, the last N of said time intervals being denominated detection intervals;

means for selecting an integer c from the set whose members are: 0, 1, 2, . . . , N−1;

means for detecting returns of said coded pulses during each of said detection intervals;

means for processing said returns, said means for processing comprising a plurality of N filters, each filter of said plurality of N filters being matched to a corresponding one of said coded pulses, said means for processing further comprising:

means for passing each of said returns detected in each said detection interval $t_n$ through a corresponding one of said filters matched to one of said coded pulses $F_j$, $j=(N+n-c) \bmod N$; and means for coherently summing the outputs of said filters generated during said detection intervals.

* * * * *